United States Patent [19]

Kretchmer

[11] Patent Number: 4,927,070
[45] Date of Patent: May 22, 1990

[54] METHOD FOR MAKING MULTI-COLORED COMPOSITE LAMINATES

[75] Inventor: Steven D. Kretchmer, 48 Francis La., Greenwich, Conn. 06831

[73] Assignees: Steven D. Kretchmer, Greenwich, Conn.; Stern Metals, Inc., Attleboro, Mass.

[21] Appl. No.: 321,597

[22] Filed: Mar. 10, 1989

[51] Int. Cl.$^5$ ............... B23K 20/04; B23K 31/00
[52] U.S. Cl. ............... 228/155; 228/160; 228/57; 228/190; 264/139; 264/162; 264/171; 264/245; 264/294
[58] Field of Search ............... 228/57, 155, 158, 159, 228/160, 190; 264/139, 162, 171, 245, 246, 294, DIG. 57, DIG. 66

[56] References Cited

U.S. PATENT DOCUMENTS

| | | | |
|---|---|---|---|
| 3,095,500 | 6/1963 | Jost | 228/243 |
| 3,113,376 | 12/1963 | Pflumm et al. | 228/190 |
| 3,465,419 | 9/1969 | Keenan et al. | 228/160 |
| 3,589,975 | 6/1971 | Andrews et al. | 228/190 |
| 3,938,723 | 2/1976 | Slaughter | 228/190 |
| 4,354,301 | 10/1982 | Takeuchi et al. | 228/190 |

FOREIGN PATENT DOCUMENTS 223679  11/1985  Japan ................ 228/160

Primary Examiner—Richard K. Seidel
Assistant Examiner—Samuel M. Heinrich
Attorney, Agent, or Firm—Pennie & Edmonds

[57] ABSTRACT

A method for making multi-colored composite laminates comprises stacking a plurality of colored strips in a predetermined pattern and bonding the strips into a composite laminate by continuous bonding. The composite laminate is then rolled before being passed through a deep steel pattern roll which forms a raised pattern on its surface. Next, the laminate is passed through a skiving table where the raised pattern is skived off to expose the multi-colored pattern formed by the underlying layers. The laminate is than flat rolled to a finished dimension and may be reeled up into a cylindrical roll.

23 Claims, 2 Drawing Sheets

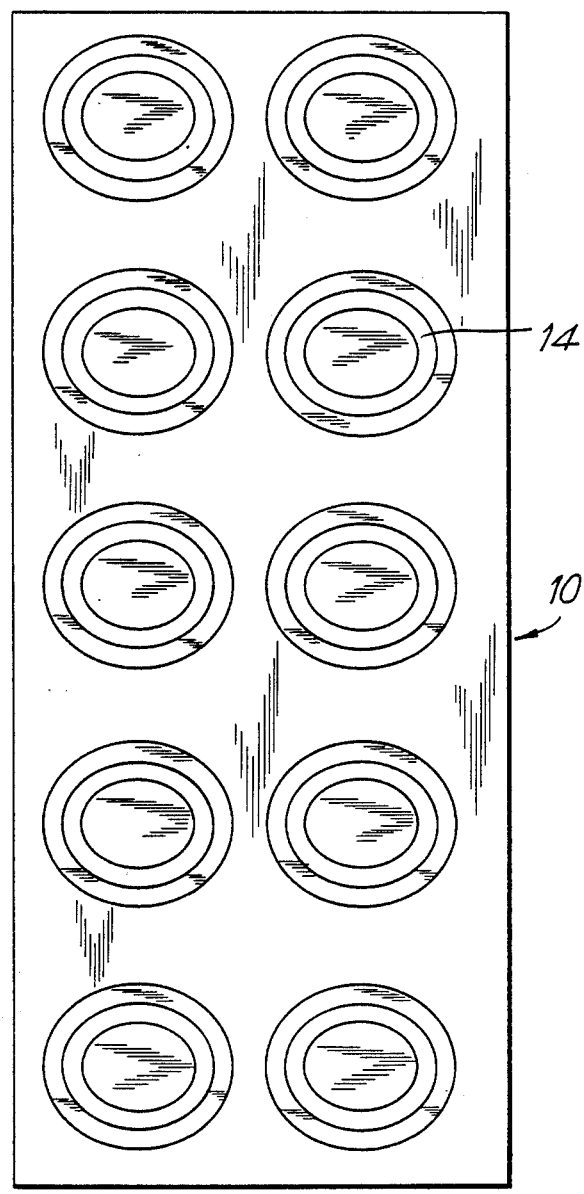

METHOD FOR MAKING MULTI-COLORED COMPOSITE LAMINATES

TECHNICAL FIELD

This invention relates to a method for making multi-layer laminates and specifically to a method of making color karat gold composite laminates.

BACKGROUND

In the prior art it is known to make patterned multi-colored sheet gold by the traditional diffusion bonding processes such as Japanese mokume-gane technique, but these techniques are inadequate for mass production. This process involves heating layers of different colored sheet metals under pressure until bonding occurs. The resulting billet is a multi-colored sandwich that can be manipulated into a variety of patterns. In order to expose the colors contained within, the billet must be further worked by forging, bending or twisting. Engraving, filing, grinding, chiseling, machining, and other material removal means have also been used to create colored patterns.

This process, however, has proven to be ineffective for large scale production. The difficulty in pouring consistently successful ingots of the zincless alloys necessary in a heat-soaking process such as mokume-gane has proven unduly expensive and time consuming. Also, the quantity of the material produced as such as limited to the size and pressure capacities of many available bonding furnaces.

Subsequent to the production of the billets, further inconvenience is encountered when manipulating the sheet material to form patterns. The amount of machining required is complicated, expensive and time consuming. In addition, the machining of the sheet metal causes burrs at grooved intersections which burrs must be removed before subsequent rolling. In final preparation, the grooves in the machined metal must be rolled out to expose the routed pattern to the outer surface. This rolling causes excessive elongation and distortion of the design. Finally, the machined grooves can create undesirable stresses within the sheet material when the metal is rolled.

SUMMARY OF THE INVENTION

The invention relates to a method for making multi-layered composites by stacking a plurality of sheets in a predetermined order or pattern and bonding these sheets under heat and pressure to form a single composite laminate. Rolling the laminate after the bonding process ensures complete cohesion.

Once the composite laminate has been bonded, one of the outer surfaces of the laminate is provided with a raised pattern. Skiving or cutting off these raised patterns exposes, in cross-section, the colors of the underlying sheets which would otherwise be hidden within the body of the laminate. This is usually accomplished by passing the laminate through a skiving table. The outline of the sheet material which was initially raised and then trimmed back now exposes color patterns on the surface of the laminate. The possible combination of patterns and desired designs is endless. Finally, the laminate is rolled to a finished dimension having a flat surface and a color design thereupon. The laminate may then be reeled up like any other roll of sheet material for convenient shipping and storage.

A variety of materials and material thicknesses may be used depending upon the desired pattern and the laminate's intended use. In order to obtain artistic patterns, colored materials are preferred. Such materials include plastics, metal or metal alloys and karat gold alloys.

The bonding of the sheet materials may be accomplished in any appropriate manner which assure good adhesion, such as continuous bonding. The raised pattern may also formed in a variety of ways such as pressing, stamping or by passing the laminate through a deep steel pattern roll.

BRIEF DESCRIPTION OF THE DRAWINGS

The nature, advantages, and various other additional features of the invention will appear more fully upon consideration of the illustrative embodiments now to be described in detail in connection with the accompanying drawing figures, wherein:

FIG. 4 is a plan view of the composite laminate illustrated in FIG. 3.

DETAILED DESCRIPTION OF THE PREFERRED EMBODIMENTS

The present invention relates to a method of making a multi-colored composite laminate wherein a variety of different colored materials are used to create ornamental patterns. Each aspect of the invention represents a significant improvement over previous manufacturing techniques. These improvements include:

(1) a finished composite strip having a flush, not grooved, surface;
(2) undistorted or elongated ornamental patterns;
(3) cost effective means for large scale production;
(4) a composite strip that can be reeled up into a roll; and
(5) an infinite number of patterns.

The method includes selecting the materials, colors, the stacking sequence, sheet width and thickness according to the final pattern desired. Other factors are also considered, such as the final width, thickness and ultimate use of the material.

A wide variety of materials are available for use in this method. For example, plastic, glass, fiberglass, metal or metal alloys may be used, however, the preferred materials include metals or metal alloys, preferably color karat gold. Materials are selected based upon features such as vividness of color, similar annealing properties and similar hardnesses.

Once the materials have been selected and the color sequence decided, strips of the material are stacked accordingly. The stack is then bonded by any suitable bonding method to form a billet having layers of different colors and/or materials. The preferred bonding method is a continuous bonding as disclosed in U.S. Pat. No. 3,095,500 to Jost which is incorporated herein by reference.

After bonding, the thin laminate stock is passed through a pattern roller to deform the layers thereby forming an embossed or raised pattern. This pattern may take on an endless variety of possible configurations but is preferably a series of ridges which are aligned in rows. Other available shapes would include cubes, cylinders or cones. The state of the art as such also introduces the possibility of forming letters to spell person or company names, or the precision to create well known patterns, distinguishing marks or logos on a consistent large scale, mass production basis.

Subsequently, the embossing is cut away or skived to expose in cross-section the colored layers of the desired design. The final design formed in cross-section depends on the geometry (height, width and shape) of the raised pattern formed by the pattern roller. For example, the final pattern may be a series of concentric ellipses aligned in rows. Each ring of the concentric ellipses will have a different color according to the stacking sequence of the laminate. Finally, the laminate is flat rolled to a finished dimension.

In an alternate embodiment, the laminate is passed simultaneously through two pattern rollers to form an embossed pattern on both the upper and lower surfaces. Thereafter, when the embossing is skived off both surfaces, a colored pattern will be formed on both.

Figure 1:
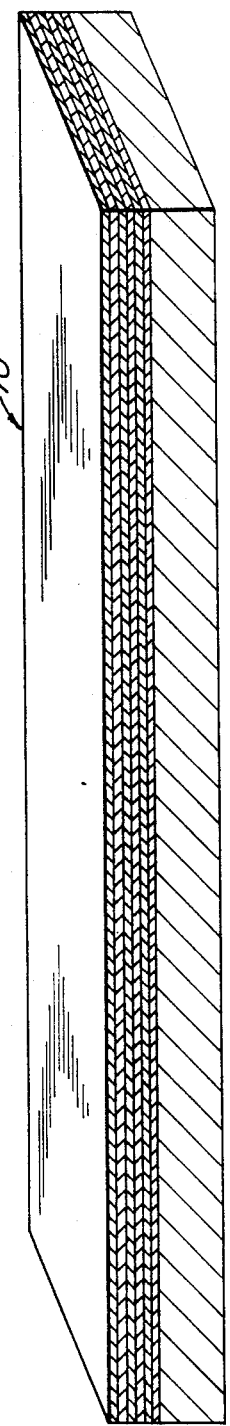
FIG. 1 is a perspective view of a composite laminate according to the invention.

Referring now to FIG. 1, there is illustrated a stacking sequence of color karat gold alloys strips which may vary in width up to and above about 3 inches. The sequence contains a variety of gold alloy strips which vary in thickness and color. The color, order and thickness of the strips are determined beforehand to comprise a desired ornamental pattern. Subsequently, the stack up is subjected to a continuous bonding procedure to form a thin bonded laminate 10. Laminate 10 is then given a final roll to ensure complete bonding and to achieve a desired thickness.

Figure 2:
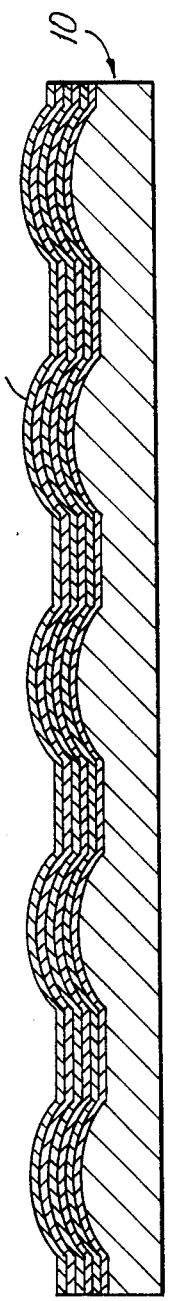
FIG. 2 is a side view of the composite laminate of FIG. 1 having a raised pattern on one surface.
Figure 3:
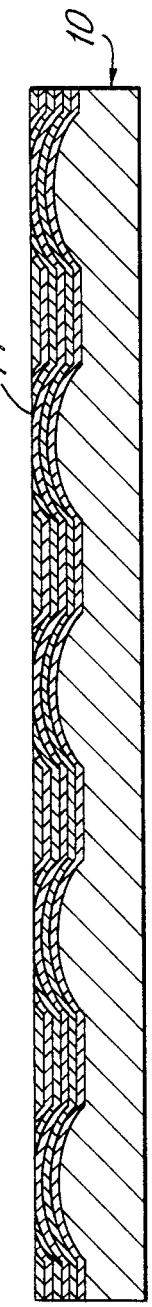
FIG. 3 is a side view of the composite laminate of FIG. 2 with the raised pattern skived.

After the final rolling, laminate 10 is passed through a deep steel pattern roll (approximately 0.30) which forms a raised pattern 12 into its surface as shown in FIG. 2. Laminate 10 is next passed through a skiving table which skives off the raised pattern as shown in FIG. 3. The skiving exposes flat bands of the underlying color karat gold 14. The resulting product is a thin, flat laminate having an ornamental and colorful pattern on one surface. Laminate 10 is then flat rolled to a finished dimension and may be reeled up into a cylindrical roll.

While it is apparent that the invention herein disclosed is well calculated to fulfill the objects above stated, it will be appreciated that numerous embodiments and modifications may be devised by those skilled in the art, and it is intended that the appended claims cover all such modifications and embodiments as fall within the true spirit and scope of the present invention.

What is claimed is:

1. A method for making multi-layered composites comprising the steps of:
   stacking a plurality of sheets in a predetermined color sequence;
   solid-phase bonding said sheets into a composite laminate;
   forming a raised pattern on an outer surface of said laminate by passing said laminate through a patterned roller;
   removing said raised patterns to form a substantially flat surface and to expose portions of sheets other than said outer surface; and
   rolling said composite laminate to a finished dimension having a flat surface and color design thereupon due to said exposed sheet portions.

2. The method of claim 1 wherein said sheets are a plurality of different colored plastic sheets.

3. The method of claim 1 wherein said sheets are metal alloy sheets having different colors.

4. The method of claim 1 wherein said sheets are karat gold alloy having different colors.

5. The method of claim 1 wherein said solid phase bonding, raised pattern forming, and finish rolling steps are continuously conducted by passing said laminate through a series of rollers.

6. The method of claim 1 which further comprises rolling said laminate after the solid-phase bonding step to a predetermined thickness to ensure complete cohesion of said sheets.

7. The method of claim 1 wherein said raised patterns are removed by passing said composite laminate through a skiving table to skive off said raised patterns.

8. The method of claim 1 which further comprises reeling said composite laminate onto a cylindrical roll.

9. A method for making multi-colored composite metal laminates comprising the steps of:
   stacking a plurality of colored metal alloy sheets in a predetermined color sequence;
   bonding said sheets into a composite laminate having layers of different colored metal alloys;
   rolling said laminate to a predetermined thickness to ensure complete cohesion of said sheets;
   passing said multi-colored composite laminate through at least one deep steel pattern roller thereby forming a raised pattern on at least one outer surface thereof;
   removing said raised pattern to form a substantially flat surface and to expose a multi-colored pattern formed by portions of said different color sheets; and
   flat rolling said composite laminate to a finished dimension.

10. The method of claim 9 wherein said metal alloy sheets are color karat gold alloy.

11. The method of claim 9 wherein said bonding is continuous.

12. The method of claim 9 wherein said composite laminate is passed through a skiving table to skive off said raised pattern.

13. The method of claim 9 which further comprises reeling said composite laminate onto a cylindrical roll.

14. The method of claim 9 wherein said laminate is passed through two deep steel pattern rolls to form raised patterns on both sides.

15. A method for making multi-layered color karat gold alloy composite laminate comprising the steps of:
   stacking a plurality of color karat gold alloy strips in a predetermined color sequence;
   bonding said strips into a composite laminate by continuous bonding;
   rolling said laminate to a predetermined thickness to ensure complete cohesion of said sheets;
   passing said laminate through a deep steel pattern roller thereby forming a raised pattern on at least one outer surface thereof;
   passing said laminate through a skiving table wherein said raised pattern is skived off to form a substantially flat surface and to expose a multi-colored pattern formed by portions of said different color sheets; and
   flat rolling said composite laminate to a finished dimension.

16. The method of claim 15 which further comprises reeling said composite laminate onto a cylindrical roll.

17. A method for mass producing reproducible multicolored composite metal laminates comprising the steps of:
- stacking a plurality of colored metal alloy sheets in a predetermined color sequence wherein at least one of said sheets has a color contrasting to the other sheets;
- solid-phase bonding said sheets into a composite laminate;
- embossing at least one outer surface of said composite laminate by passing the laminate through a patterned roller to form an embossed pattern;
- removing said embossed pattern to form a substantially flat surface and to expose portions of sheets other than said outer surface; and
- rolling said composite laminate to a finished dimension having a flush surface and repeatable color design thereupon due to said exposed sheet portions.

18. The method of claim 17 wherein said sheets are karat gold alloys.

19. The method of claim 17 wherein said solid-phase bonding, embossing, and finish rolling steps are continuously conducted by passing said laminate through a series of rollers.

20. The method of claim 19 which further comprises rolling said laminate after the bonding step to a predetermined thickness to ensure complete cohesion of said sheets.

21. The method of claim 17 wherein said embossed pattern is removed by passing said composite laminate through a skiving table to skive off said embossed pattern.

22. The method of claim 20 which further comprises reeling said laminate onto a cylindrical roll.

23. The method of claim 17 which further comprises simultaneously embossing both the top and bottom outer surfaces of said composite by passing the laminate through upper and lower pattern rollers prior to removing the embossed patterns and rolling of the laminate to a finish dimension.

* * * * *